(12) United States Patent
Masters

(10) Patent No.: US 11,346,558 B2
(45) Date of Patent: May 31, 2022

(54) FUEL INJECTOR

(71) Applicant: ROLLS-ROYCE plc, London (GB)

(72) Inventor: Jonathan D. Masters, Birmingham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 16/929,142

(22) Filed: Jul. 15, 2020

(65) Prior Publication Data

US 2021/0018175 A1    Jan. 21, 2021

(30) Foreign Application Priority Data

Jul. 18, 2019   (GB) ...................................... 1910284

(51) Int. Cl.
| | |
|---|---|
| *F23R 3/00* | (2006.01) |
| *F23R 3/28* | (2006.01) |
| *F02C 7/14* | (2006.01) |
| *F02C 7/18* | (2006.01) |
| *F23R 3/34* | (2006.01) |

(52) U.S. Cl.
CPC ................ *F23R 3/283* (2013.01); *F02C 7/14* (2013.01); *F02C 7/185* (2013.01); *F23R 3/343* (2013.01)

(58) Field of Classification Search
None
See application file for complete search history.

(56) References Cited

U.S. PATENT DOCUMENTS

| | | |
|---|---|---|
| 5,794,449 A | 8/1998 | Razdan et al. |
| 2009/0038312 A1 | 2/2009 | Hernandez et al. |
| 2009/0140073 A1 | 6/2009 | Thomson et al. |
| 2012/0228397 A1* | 9/2012 | Thomson ................ F23R 3/343 239/13 |

FOREIGN PATENT DOCUMENTS

| | | |
|---|---|---|
| DE | 102015122924 A1 | 6/2016 |
| EP | 0620402 | 10/1994 |
| EP | 1087178 A1 | 3/2001 |
| EP | 2241815 A3 | 10/2010 |

(Continued)

OTHER PUBLICATIONS

Great Britain search report dated Jan. 15, 2020, issued in GB Patent Application No. 1910284.7.
(Continued)

*Primary Examiner* — Edwin Kang
(74) *Attorney, Agent, or Firm* — Shumaker & Sieffert, P.A.

(57) ABSTRACT

A fuel injector for a gas turbine engine, the injector comprising a main fuel flow circuit and a pilot fuel flow circuit. The pilot fuel flow circuit comprises at least one convoluted pilot fuel flow passage extending continuously from a pilot fuel feed at an upstream end of the injector to a pilot fuel spray nozzle inlet. The at least one pilot fuel flow passage comprises at least two axially-extending portions extending between the upstream end of the injector towards a downstream end of the injector and joined by an elbow portion proximal the downstream end of the injector. In use, pilot fuel can flow in opposing axial directions within the at least two axially-extending portions, the axially-extending portions being in thermal communication with the main fuel flow circuit.

12 Claims, 8 Drawing Sheets

(56) References Cited

FOREIGN PATENT DOCUMENTS

| | | |
|---|---|---|
| EP | 2241816 | 10/2010 |
| EP | 3290804 A1 | 3/2018 |
| EP | 3425281 A1 | 1/2019 |
| GB | 1031184 | 6/1966 |
| GB | 2562828 | 11/2018 |
| GB | 2570035 | 7/2019 |
| WO | 2017009247 A1 | 1/2017 |

OTHER PUBLICATIONS

European search report dated Nov. 10, 2020, issued in EP Patent Application No. 20181841.6.

\* cited by examiner

FUEL INJECTOR

CROSS-REFERENCE TO RELATED APPLICATIONS

This specification is based upon and claims the benefit of priority from UK Patent Application Number GB 1910284.7 filed on 18 Jul. 2019, the entire contents of which are incorporated herein by reference.

BACKGROUND

Technical Field

The present disclosure relates to a fuel injector for a combustion system e.g. for a lean-burn combustion system within a gas turbine engine. The present disclosure also relates to a combustion system having a fuel injector, to a gas turbine engine having a combustion system and to a method of heat exchange within a fuel injector.

Description of Related Art

A gas turbine engine typically comprises, in axial flow arrangement, a fan, one or more compressors, a combustion system and one or more turbines. The combustion system typically comprises a plurality of fuel injectors each having an injector nozzle which mixes fuel and air flows for delivery to a combustion chamber.

Lean-burn combustion systems typically direct a greater proportion of air flow at the injector nozzle compared to a rich-burn system which directs only a modest portion of the air flow at the injector nozzle.

Injectors in known lean-burn systems each have two fuel flows (within a pilot flow circuit and a main flow circuit) and one or more air flows. The air flows serve to maintain separation of the two fuel flows until the point of ignition and to define the flow fields and resulting flame shape in the combustion chamber.

The fuel flow in each of the pilot flow circuit and main flow circuit is typically varied/staged throughout the combustion cycle of the combustion system. At certain times during the combustion cycle (i.e. during engine ignition and at low power operation), the main fuel flow is "staged out" (i.e. ceased) whilst the pilot fuel flow is maintained. There is tendency for the stagnant fuel within the main fuel flow circuit to form carbonaceous deposits (coke) on the hot walls of the main flow circuit. This can degrade engine performance.

The injector body of the known injectors is typically formed using three concentric tubes that are brazed together using an unreliable/unpredictable nickel phosphorus brazing process. The pilot and main flow circuits are formed by machining channels into the opposing outer surfaces of adjacent tubes. The pilot and main flow circuits extend generally circumferentially in thermal communication with one another so that flow within the pilot circuit can reduce the wetted wall temperature of the main flow circuit in some (but not all) portions of the main flow circuit. Known designs focus on cooling the main flow circuit in the vicinity of a fuel exit port from the main flow circuit. The fuel exit port is typically formed in a portion of the injector body that is called a "prefilmer" and is provided adjacent the injector nozzle. This is an area of high thermal strain as the prefilmer is subjected to radiative heat loads from the combustor gas cloud which causes high thermal gradients. The fuel exit port in this location is considered to be a low cycle limiting feature of the injector.

There is a need to more effectively reduce the fuel wetted wall temperature within the main fuel flow circuit when the main fuel flow is ceased in order to reduce the tendency for carbonaceous deposit formation.

There is a need to provide an injector body that can be manufactured without using the unreliable nickel phosphorus process.

There is a need to reduce the challenges to the service life of the injector provided by location of the fuel exit port.

SUMMARY

The present disclosure provides a fuel injector for a gas turbine engine, a combustion system, a gas turbine engine, and a method of cooling a main fuel flow circuit within a fuel injector for a gas turbine engine, as set out in the appended claims.

According to a first aspect there is provided a fuel injector for a gas turbine engine, the injector comprising a pilot fuel flow circuit comprising at least one pilot fuel flow passage extending from a pilot fuel feed at an upstream end of the injector to a pilot spray nozzle inlet, and a main fuel flow circuit comprising at least one main fuel flow passage extending from a main fuel feed at the upstream end of the injector to a main spray nozzle inlet, wherein the at least one pilot fuel flow passage and the at least one main fuel flow passage each comprise a respective at least one axially-extending portion, wherein the at least one axially-extending portion of the main fuel flow passage and the at least one axially-extending portion of the pilot fuel flow passage are concentrically arranged, and wherein the at least one axially-extending portion of the main fuel flow passage is concentrically radially-inwards of a respective one of the axially-extending portions of the pilot fuel flow passage.

By providing a pilot fuel flow passage with an axially-extending portion concentrically arranged with an axially-extending portion of the main fuel flow passage, it is possible to have increased thermal communication between the main fuel flow passage and pilot fuel flow passage. This facilitates a more effective heat transfer from the main fuel flow passage and thus a more effective lowering of the wetted wall temperature of the main fuel flow passage when there is no main fuel flow which, in turn, reduces formation of carbonaceous deposits in the main fuel flow passage.

Each axially-extending portion of the main fuel flow passage is concentrically radially-inwards of a respective one of the axially-extending portions of the pilot fuel flow passage. This helps minimise conduction losses.

In some embodiments, the at least one pilot fuel flow passage is a convoluted pilot fuel flow passage extending continuously from the pilot fuel feed to the pilot spray nozzle inlet, the at least one pilot fuel flow passage comprising at least two axially-extending portions joined by an elbow portion proximal the downstream end of the injector such that, in use, pilot fuel can flow in opposing axial directions within the at least two axially-extending portions, the axially-extending portions being in thermal communication with the main fuel flow circuit.

In these embodiments, the pilot fuel can (in use), flow axially downstream (away from the upstream end of the injector) in a first axially-extending portion before deflecting (in the elbow portion) and flowing in the opposite axial direction with a second axially-extending portion (back towards the upstream end of the injector).

In some embodiments, the at least one convoluted pilot fuel flow passage comprises an even number (greater than two) of axially-extending portions e.g. four or six axially-extending portions. In these embodiments, each axially-extending portion has an upstream end proximal the upstream end of the injector and a downstream end distal the upstream end of the injector (proximal the downstream end of the injector), and adjacent axially-extending portions of the pilot fuel flow passage are connected (via a respective elbow portion) alternately at their upstream and downstream ends.

Accordingly, in use, where there are four axially-extending portions, pilot fuel will flow from the pilot fuel feed at the upstream end of the injector and axially along a first axially-extending portion (towards the downstream end of the injector). The at least one pilot fuel flow passage then deflects (at a first elbow portion proximal the downstream end of the injector) such that the pilot fuel flows within a second axially-extending portion in an opposite direction (back towards the upstream end of the injector). The pilot fuel will then deflect again (within a second elbow portion proximal the upstream end of the injector) and flow axially along a third axially-extending portion (back towards the downstream end of the injector). Finally, the pilot fuel will deflect within a third elbow portion proximal the downstream end of the injector so that pilot fuel then flows back towards the upstream end of the injector within the fourth axially-extending portion. It will be apparent that where there are six axially-extending portions, there are two further elbow portions (one proximal the upstream end of the injector and one proximal the downstream end of the injector).

The pilot spray nozzle inlet may be provided proximal the upstream end of the injector. The pilot fuel flow circuit may comprise at least one radial portion extending to the pilot spray nozzle inlet from at least one of the axially-extending portions.

The axially-extending portions of the at least one pilot fuel flow passage are circumferentially-spaced from one another and preferably equally circumferentially-spaced from one another. They extend parallel to one another in an axial direction.

In some embodiments, the pilot fuel circuit comprises two or more convoluted pilot fuel flow passages extending continuously from the pilot fuel feed at the upstream end of the injector to the pilot spray nozzle inlet. For example, there may be two convoluted pilot fuel flow passages, each comprising six axially-extending portions (and five elbow portions—three distal the upstream end of the injector and two proximal the upstream end of the injector). Where there are two convoluted pilot fuel flow passages, the first axially-extending portions in each pilot fuel flow passage (i.e. the axially-extending portions proximal the pilot fuel feed through which pilot fuel flows first) may be circumferentially adjacent one another.

The axially-extending portions of the at least one or two or more convoluted pilot fuel flow passages may be spaced around the entire circumference of the injector. Where there are two pilot fuel flow passages, they may each provide for flow in opposite circumferential directions i.e. one may deflect circumferentially substantially clock-wise whilst the other may deflect circumferentially substantially anti-clock-wise.

The or each elbow portion may comprise a single curved portion (e.g. having a curve of 180 degrees). Alternatively, the or each elbow portion comprise two deflections (e.g. each having a deflection of 90 degrees) spaced by a respective circumferentially-extending portion.

In some embodiments, the main fuel flow circuit extends from a main fuel feed (at the upstream end of the injector) to a main spray nozzle inlet at the downstream end of the injector. The at least one main fuel flow passage may comprise at least one circumferentially-extending portion proximal the upstream end of the injector and in fluid communication with the at least one axially-extending portion. Each circumferentially-extending portion may be in fluid communication with a plurality of (e.g. three) axially-extending portions (e.g. a plurality of circumferentially spaced (e.g. equally circumferentially-spaced) axially-extending portions). There may be a plurality of (e.g. four) circumferentially-extending portions each depending form the main fuel feed and each connected to a plurality of (e.g. three) axially-extending portions. There may be up to twelve axially-extending portions of the main fuel flow passage depending from the circumferentially-extending portion(s).

The axially-extending portions of the main fuel flow passage are in thermal communication (i.e. in heat transfer relationship) with the axially-extending portions of the pilot fuel flow passage. There may be an equal number of axially-extending portions in the main fuel flow passage and pilot fuel flow passage. Thus each axially-extending portion of the main fuel flow passage may be in thermal communication with one of the axially-extending portions of the pilot fuel flow passage.

The axially-extending portions of the main fuel flow passage may each comprise a main fuel outlet proximal the downstream axial end of the injector (proximal the main spray nozzle). The main fuel outlets may be provided in the downstream axial ends of each of the axially-extending portions of the main fuel flow passage. The/each main fuel outlet may face in a circumferential direction i.e. may be in a radial side of the respective axially-extending portion of the main fuel flow passage. To facilitate this, each axially-extending portion of the main fuel flow passage extends further towards the downstream end of the fuel injector than the respective axially-extending portion of the pilot fuel flow passage.

In some embodiments, the injector comprises an upstream manifold comprising the pilot fuel feed and the main fuel feed and a downstream manifold comprising the main spray nozzle.

The upstream and downstream manifolds are axially separated by a plurality of circumferentially-spaced, axially-extending heat transfer conduits, wherein each heat transfer conduit comprises one of the axially-extending portions of the at least one pilot fuel flow passage. Adjacent heat transfer conduits will contain adjacent axially-extending portions of the at least one pilot fuel flow passage/at least one main fuel flow passage.

The upstream manifold may comprise an annular portion and a fuel tube carrying the pilot fuel feed and the main fuel feed. The pilot fuel feed and main fuel feed may be concentric within the fuel tube. The pilot fuel feed may be radially outwards of the main fuel feed.

The upstream manifold may further comprise the pilot spray nozzle with the pilot spray nozzle inlet located proximal the upstream end of the injector/upstream manifold. The pilot spray nozzle may be supported within the annular portion by radial struts. The radial portion(s) of the pilot fuel flow passage may extend within/along at least one of the radial struts.

The pilot fuel spay nozzle may extend axially forwards of the annular portion and may be encircled by the heat transfer conduits. There is preferably a radial spacing between the pilot spray nozzle and the heat transfer conduits. The pilot spray nozzle comprises a nozzle opening which may be proximal the downstream manifold.

The downstream manifold may comprise an upstream annular portion and downstream inner and outer walls defining a spin chamber therebetween. The main fuel outlets may open into this spin chamber. There is an annular spin chamber opening encircled by a prefilmer surface that defines the main spray nozzle opening.

As discussed above, each heat transfer conduit carries one of the axially-extending portions of the at least one pilot fuel flow passage and one of the axially-extending portions of the at least one main fuel flow passage. In some embodiments, one of the axially-extending portions of the main fuel flow passage and one of the axially-extending portions of the pilot fuel flow passage are housed concentrically within each heat transfer conduit. The axially-extending portion of the main fuel flow passage may be concentrically radially-inwards of the axially-extending portion of the pilot fuel flow passage within each heat transfer conduit. The axially-extending portion of the main fuel flow passage may extend further towards the downstream end of the fuel injector than the respective axially-extending portion of the pilot fuel flow passage. The or each axially-extending portion of the main fuel flow passage may terminate in a cap portion and the main fuel outlet(s) may be provided in the cap portion (s). The cap portion(s) are housed within the spin chamber. The cap portions may be spaced from the axial downstream ends of the heat transfer conduits to define an axial space therebetween from which main fuel can flow into the respective elbow portion.

The heat transfer conduits may have an axial length greater than the axial spacing between the upstream and downstream manifolds such that the heat transfer conduits extend within the downstream manifold (e.g. within the annular portion) to proximal the main spray nozzle inlet.

The axially-extending portion of the main fuel flow passage may extend further towards the downstream end of the fuel injector than the respective axially-extending portion of the pilot fuel flow passage and further downstream than the respective heat transfer conduit. The or each axially-extending portion of the main fuel flow passage may terminate in a cap portion and the main fuel outlet(s) may be provided in the cap portion (s). The cap portion(s) are housed within the spin chamber. The cap portions may be spaced from the axial downstream ends of the heat transfer conduits to define an axial space therebetween from which main fuel can flow into the respective elbow portion.

By providing the main fuel outlets in the cap portions rather than within the prefilmer surface of the downstream manifold, the outlets are isolated from the radiative heat loads that affect the prefilmer surface. Furthermore, the main fuel outlets can be tested at a component level thus reducing the need for scrapping of the injector sub-assembly.

In some embodiments, the elbow portion(s) of the at least one pilot fuel flow passage are within the upstream and downstream manifolds respectively. For example, the elbow portions within the downstream manifold may be machined into the upstream annular portion of the downstream manifold.

The manifolds and heat transfer conduits may be brazed together using traditional brazing methods (without any need for the unreliable/unpredictable) nickel phosphorus brazing process. Alternatively, one or more of the manifold(s) and/or heat transfer conduits could be manufactured by additive layer manufacturing (ALM) either separately or integrally. In particular, the heat transfer conduits may be manufactured by ALM.

In some embodiments, the heat transfer conduits may be produced integrally with the upstream manifold. This reduces the number of brazing operations necessary.

In a second aspect, there is provided a combustion system for a gas turbine engine, wherein the combustion system comprises a fuel injector according to the first aspect.

In a third aspect, there is provided a gas turbine engine comprising a fuel injector according to the first aspect or a combustion system according to the second aspect.

The gas turbine engine may comprise an engine core comprising a turbine, a compressor, and a core shaft connecting the turbine to the compressor. It may further comprise a fan located upstream of the engine core, the fan comprising a plurality of fan blades. It may further comprise a gearbox that receives an input from the core shaft and outputs drive to the fan so as to drive the fan at a lower rotational speed than the core shaft.

In some embodiments, the turbine is a first turbine, the compressor is a first compressor, and the core shaft is a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In a fourth aspect, there is a method of cooling a main fuel flow circuit within a fuel injector for a gas turbine engine, the injector comprising a main fuel flow circuit and a pilot fuel flow circuit, the method comprising the steps of: flowing pilot fuel within at least one axially-extending portion of at least one pilot fuel flow passage; and flowing main fuel within at least one axially-extending portion of at least one main fuel flow passage, the axially-extending portions of the pilot fuel flow passage and main fuel flow passage being concentrically arranged e.g. with the axially-extending portion of the pilot fuel flow passage being radially outwards of the axially-extending portion of the main fuel flow passage, the method further comprises flowing pilot fuel in opposing axial directions within at least two axially-extending portions of at least one convoluted pilot fuel flow passage, the at least one convoluted pilot fuel flow passage extending continuously from a pilot fuel feed at an upstream end of the injector to a pilot spray nozzle inlet, the axially-extending portions being in thermal communication with the main fuel flow circuit.

In some embodiments, where the at least one convoluted pilot fuel flow passage comprises an even number (greater than two) of axially-extending portions e.g. four or six axially-extending portions and adjacent axially-extending portions of the pilot fuel flow passage are connected (via a respective elbow portion) alternately at their upstream and downstream ends, the method first comprises flowing pilot fuel from the pilot fuel feed at the upstream end of the injector and axially along a first axially-extending portion (towards the downstream end of the injector). The method then comprises deflecting the pilot fuel flow (at a first elbow portion proximal the downstream end of the injector) such that the pilot fuel flows within a second axially-extending portion in an opposite direction (back towards the upstream end of the injector). The method then comprises deflecting the pilot fuel flow again (within a second elbow portion proximal the upstream end of the injector) and flowing it axially along a third axially-extending portion (back towards the downstream end of the injector). Finally, the method comprises deflecting the pilot fuel flow within a third elbow portion proximal the downstream end of the injector and flowing it back towards the upstream end of the injector within the fourth axially-extending portion. It will be apparent that where there are six axially-extending portions, the method comprises two further deflections of the pilot fuel flow (one proximal the upstream end of the injector and one proximal the downstream end of the injector).

In some embodiments, the method further comprises flowing the pilot fuel within a pilot fuel circuit comprising two or more convoluted pilot fuel flow passages extending continuously from the pilot fuel feed at the upstream end of the injector to the pilot spray nozzle inlet.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
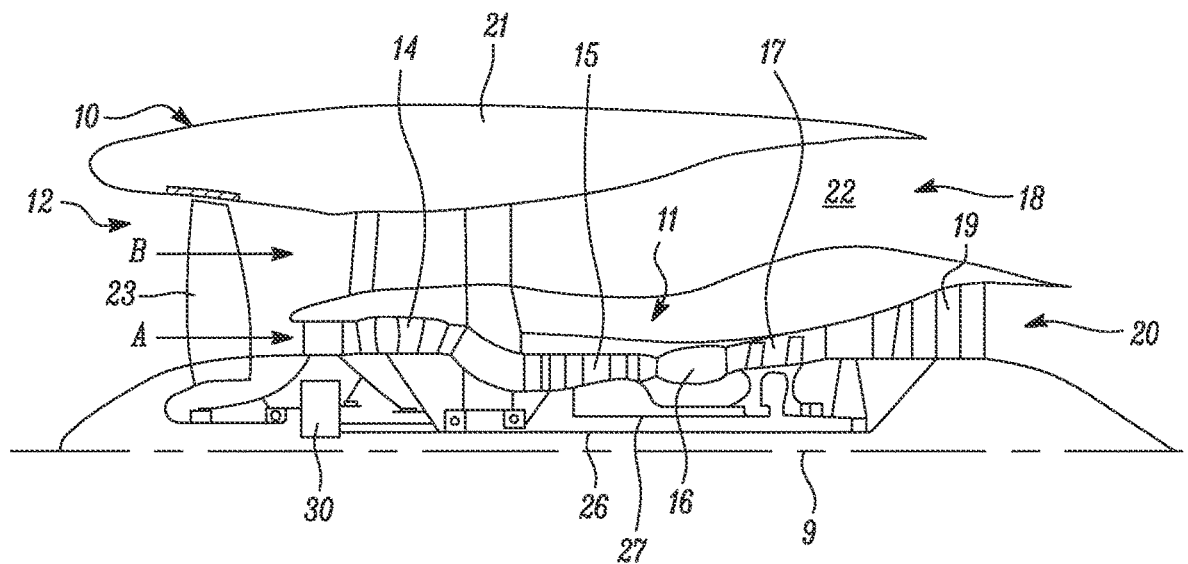
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion system 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion system 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
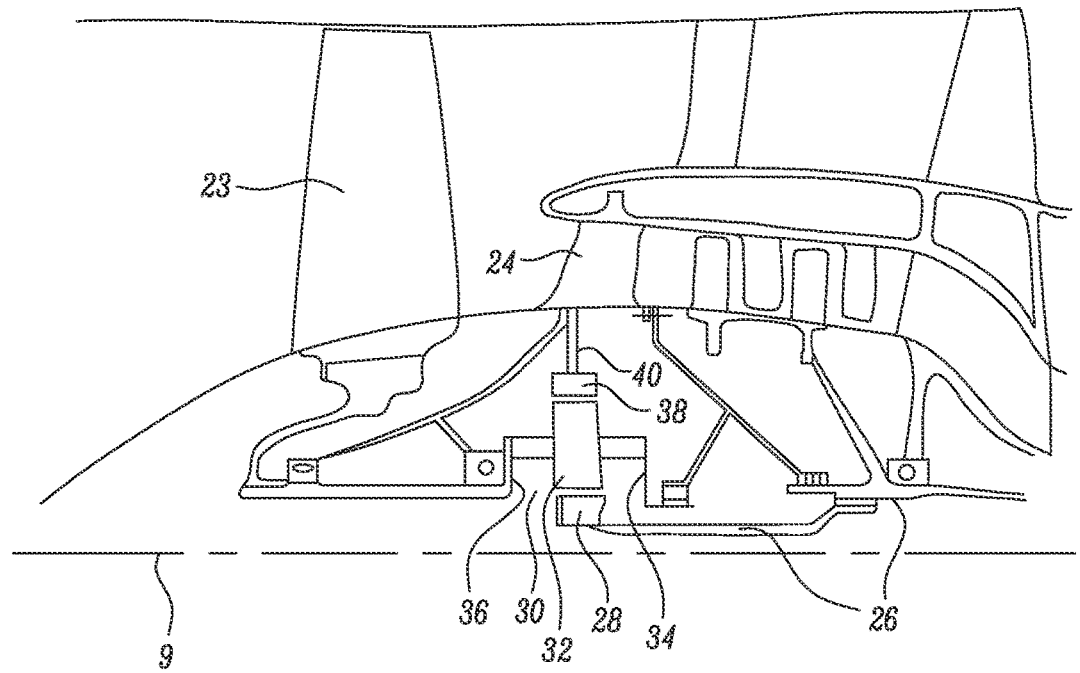
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
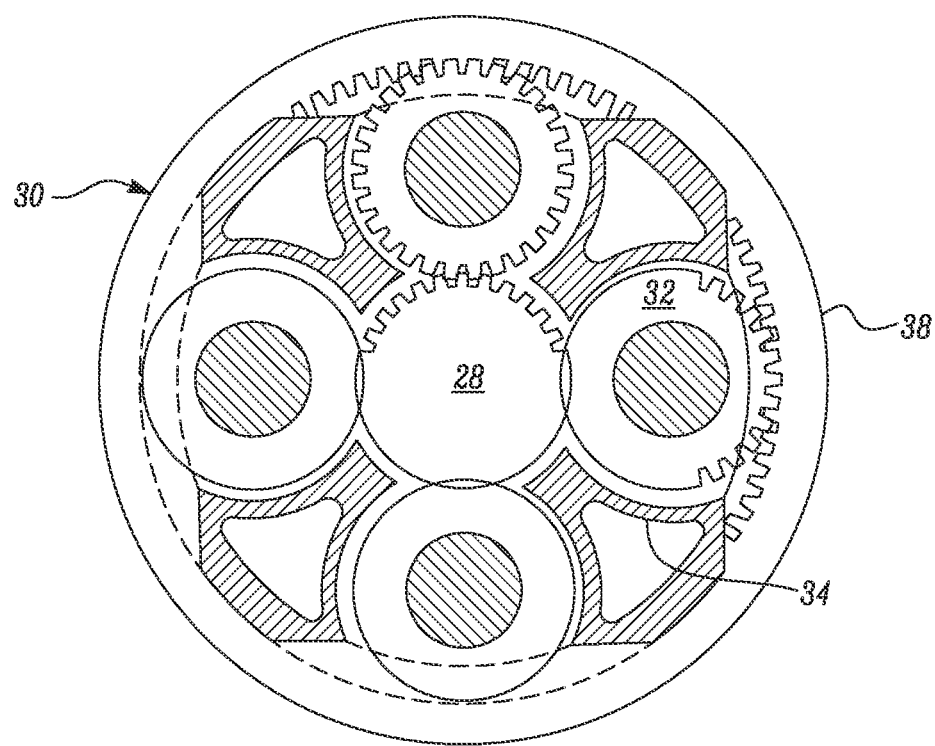
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
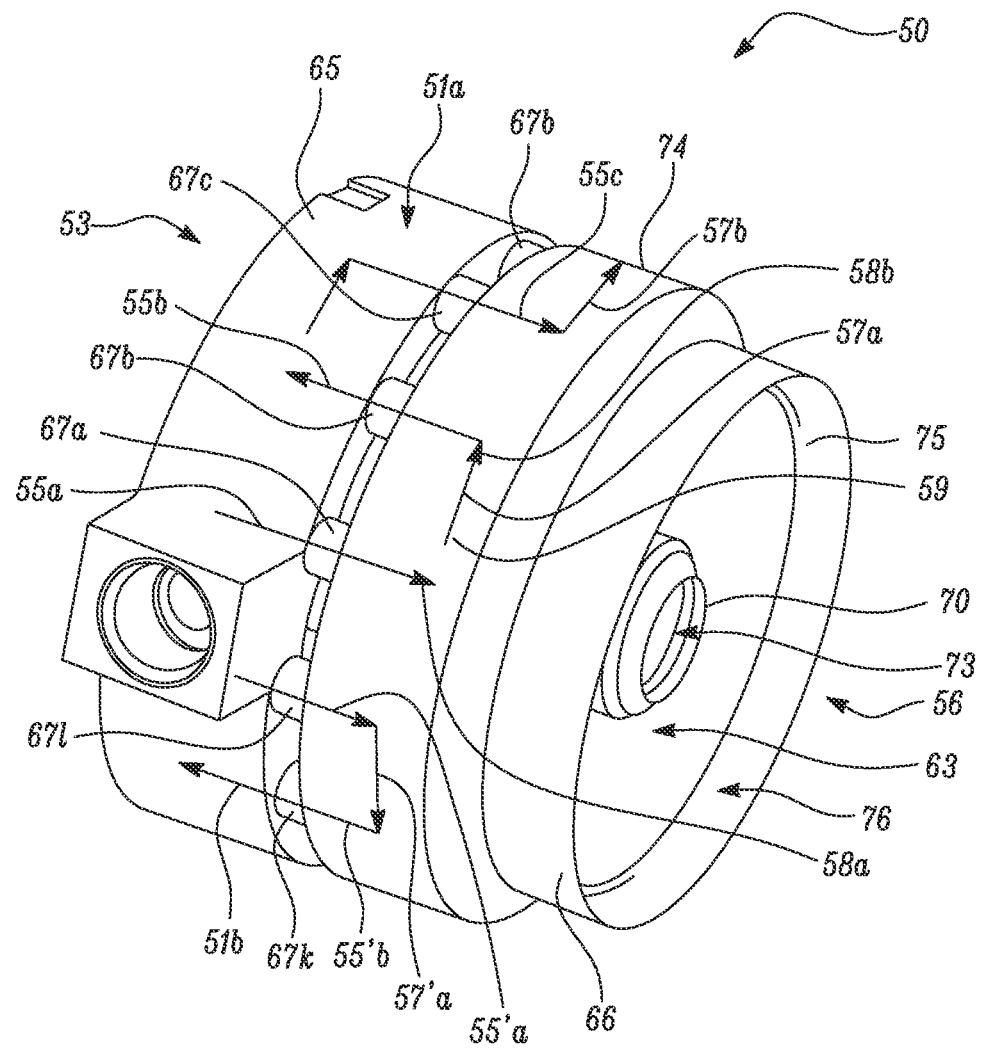
FIG. 4 is a perspective view of a fuel injector according to a first embodiment.
Figure 6:
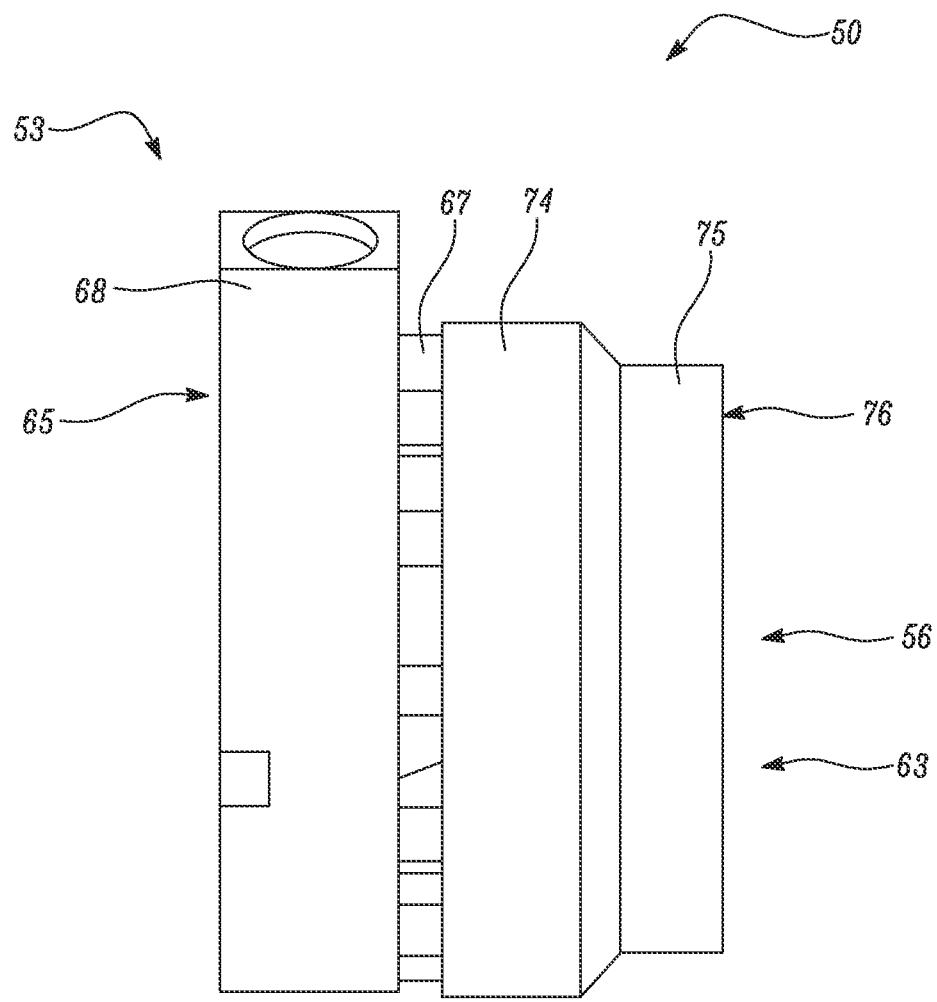
FIG. 6 is a side view of the fuel injector according to the first embodiment.
Figure 7:
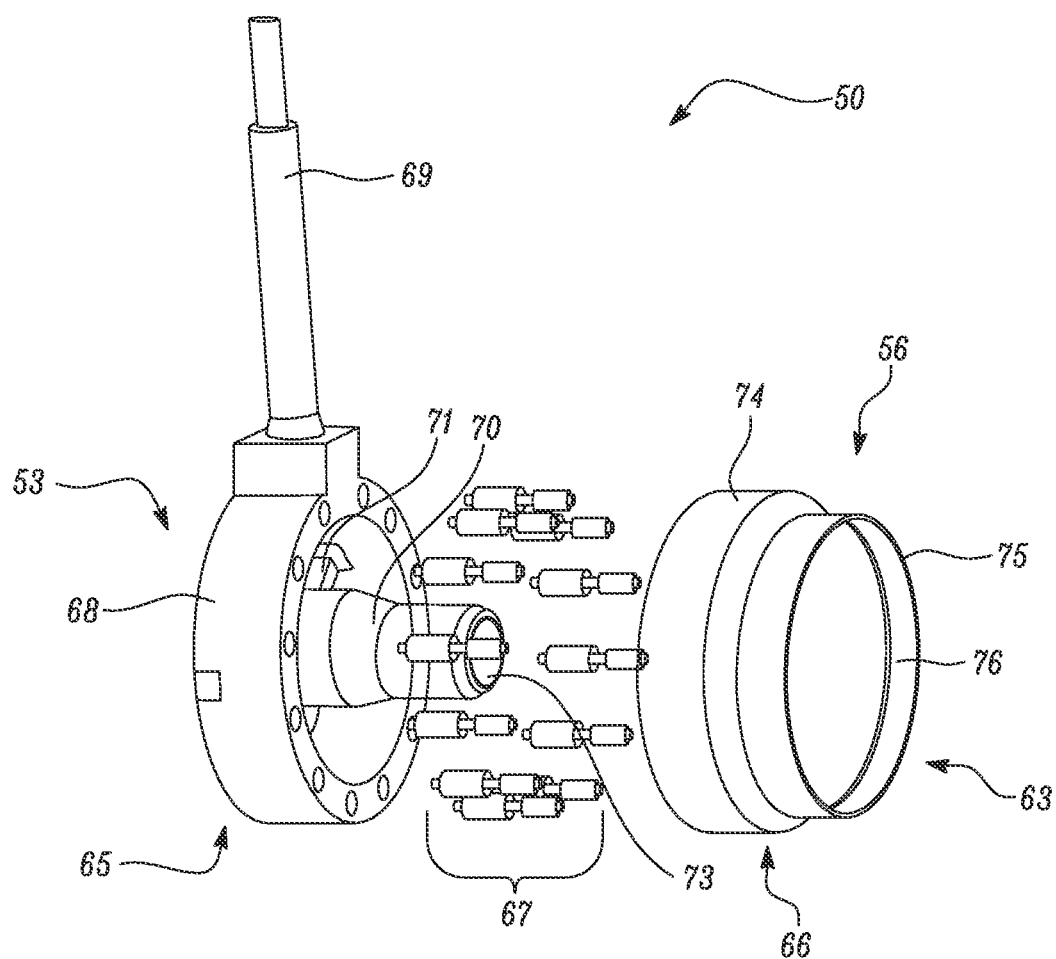
FIG. 7 is an exploded perspective view of the fuel injector according to the first embodiment.

FIGS. 4, 6 and 7 show a perspective view, side view and exploded view respectively of a fuel injector 50 according to a first embodiment.

The fuel injector 50 forms part of the combustion system 16 and is provided to inject fuel and air into a combustion chamber for ignition. The fuel injector 50 is a staged fuel injector meaning that it comprises a main fuel flow circuit and a pilot fuel flow circuit. Main fuel flow circuit is "staged out" during engine ignition and low power operation modes and when this occurs, stagnant fuel remains within the main fuel flow circuit. There is a need to cool the main fuel flow circuit to ensure that carbonaceous deposits are not formed from the stagnant fuel. The fuel injector 50 aims to effect such cooling of the main fuel flow circuit.

Accordingly, the fuel injector 50 comprises a two convoluted pilot fuel flow passages 51, 51' extending continuously from a pilot fuel feed 52 at an upstream end 53 of the fuel injector 50 to a pilot fuel spray nozzle inlet 54 which is also at the upstream end 53 of the fuel injector.

Figure 5A:
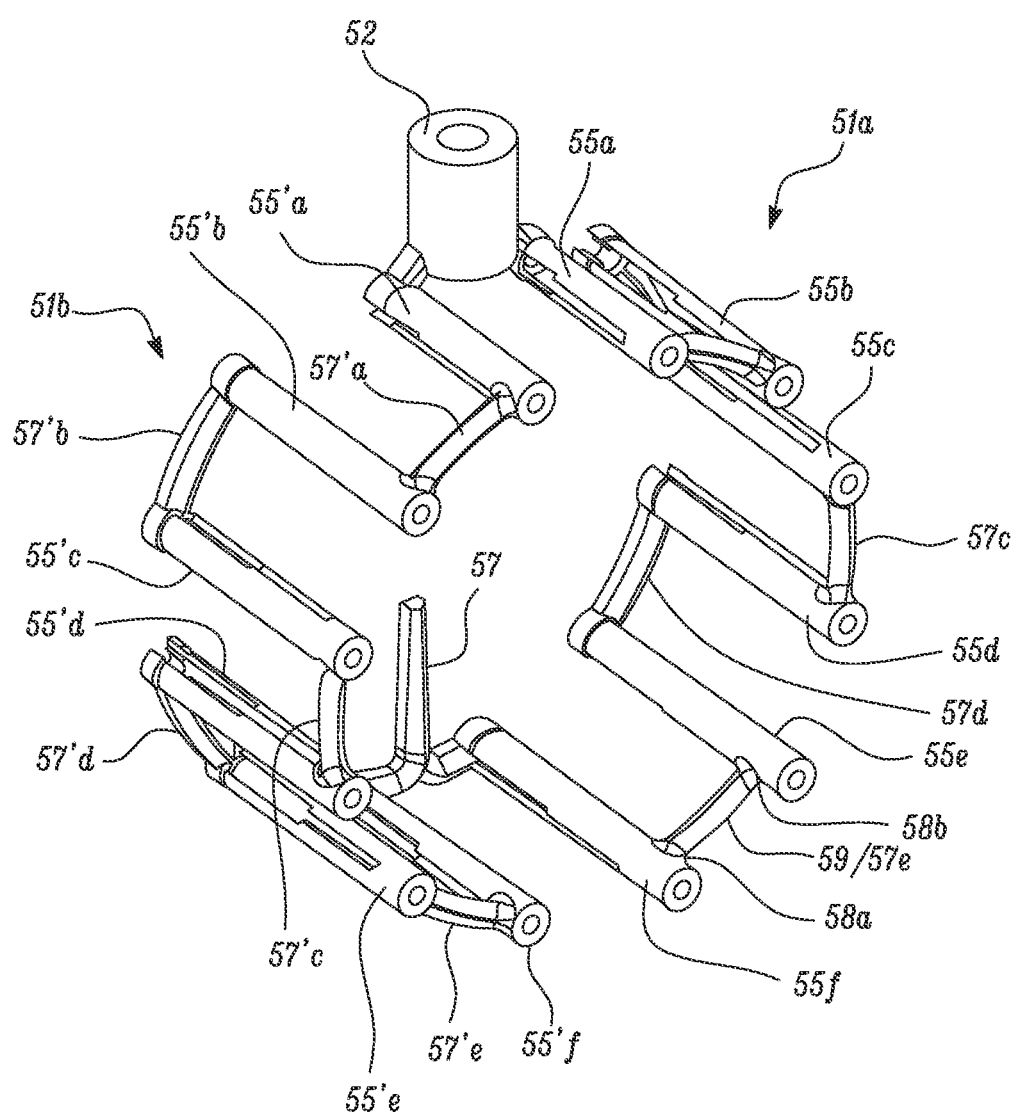
FIG. 5a shows the pilot fuel flow path through the fuel injector according to the first embodiment.

As shown in FIG. 5a, each pilot fuel flow passage comprises six axially-extending portions 55a-f, 55'a-f which are circumferentially arranged and equally spaced. Each axially-extending portion 55a-f, 55'a-f has an upstream end proximal the upstream end 53 of the fuel injector 50 and a downstream end proximal an opposing downstream end 56 of the fuel injector. Adjacent i.e. circumferentially adjacent axially-extending portions 55a-f, 55'a-f are alternately joined at their downstream ends and their upstream ends by elbow portions 57a-e, 57'a-e.

As can be seen in FIGS. 4 and 5a, each elbow portion comprises two deflections 58a, 58b spaced by a circumferentially-extending portion 59.

Accordingly, within each pilot fuel flow passage, pilot fuel flows:

1) from the pilot fuel feed 52 at the upstream end of the fuel injector 50 along the first axially-extending portion 55a, 55'a towards the downstream end 56 of the fuel injector;

2) through the first elbow portion 57a, 57'a at the downstream end 56 of the fuel injector 50;

3) towards the upstream end 53 of the fuel injector 50 along the second axially-extending portion 55b, 55'b;

4) through the second elbow portion 57b, 57'b at the upstream end 53 of the fuel injector 50;

5) towards the downstream end 56 of the fuel injector 50 through the third axially-extending portion 55c, 55'c;

6) through the third elbow portion 57c, 57'c at the downstream end 56 of the fuel injector 50;

7) towards the upstream end 53 of the fuel injector 50 along the fourth axially-extending portion 55d, 55'd;

8) through the fourth elbow portion 57d, 57'd at the upstream end 53 of the fuel injector 50;

9) towards the downstream end 56 of the fuel injector 50 through the fifth axially-extending portion 55e, 55'e;

10) through the fifth elbow portion 57e, 57'e at the downstream end 56 of the fuel injector 50; and 11) towards the upstream end 53 of the fuel injector 50 along the sixth axially-extending portion 55f, 55'f.

This path takes each pilot fuel flow passage 51a, 51b half way (180 degrees) around the circumference of the fuel injector 50 in opposite directions i.e. the circumferentially extending portions 59 in the elbow portions 57a-e, 57'a-e may carry pilot fuel flow anti-clockwise in one pilot fuel flow passage 51a and clockwise in the other pilot fuel flow passage 51b. In this way, the pilot fuel flow circuit comprises axially-extending portions 55a-f, 55'a-f spaced around the entire circumference of the fuel injector 50.

The sixth axially-extending portions 55f, 55f' are each connected to a radially extending portion 72 which extends to the radially inwards pilot fuel spray nozzle inlet 54.

The axially-extending portions 55a-f, 55'a-f of the pilot fuel flow passages 51a, 51b are in thermal communication with the main fuel flow circuit.

Figure 5B:
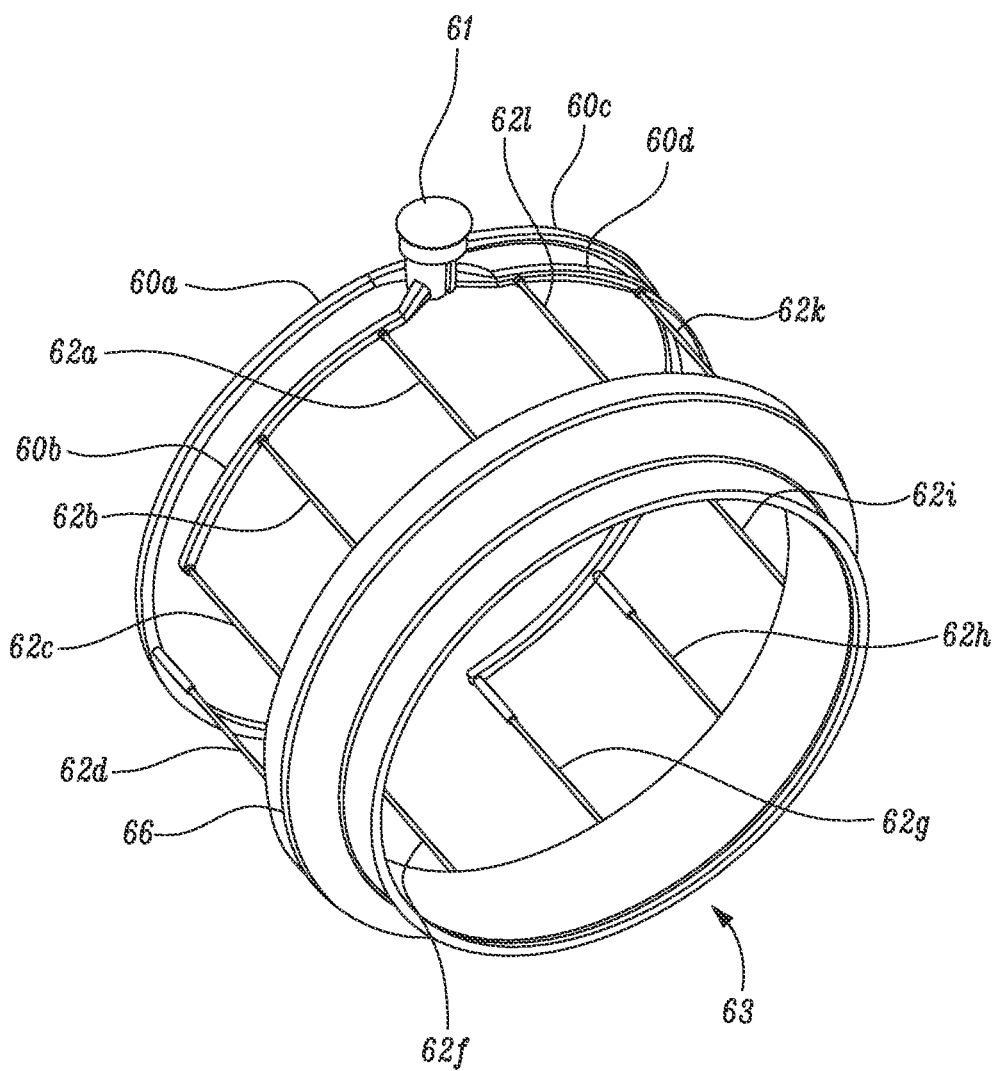
FIG. 5b shows the main fuel flow path through the fuel injector according to the first embodiment.

As shown in FIG. 5b, the main fuel flow circuit comprises a main fuel flow passage comprising four circumferentially-extending portions 60a-d at the upstream end 53 of the fuel injector 50 which extend from the main fuel feed 61. There are twelve axially-extending portions 62a-l of the main fuel flow passage, three of which extend from each of the four circumferentially-extending portions 60a-c at the upstream end 53 of the fuel injector to a main spray nozzle inlet 63.

Each of the twelve axially-extending portions 62a-l of the main fuel flow passage is in heat transfer relationship with one of the axially-extending portions 55a-f, 55'a-f of the two pilot fuel flow passages 51a, 51b. The axially-extending portions 55a-f, 55'a-f of the pilot fuel flow passages 51a, 51b are each arranged concentrically radially-outwards of the respective axially-extending portion 62-a-l of the main fuel flow passage. In this way, the pilot fuel flow within the axially-extending portions 55a-f, 55'a-f of the pilot fuel flow passages can flow axially around any stagnant main fuel within the axially-extending portions 62a-l of the main fuel flow passage in opposing axial directions in adjacent axially-extending portions 55a-f, 55'a-f of the pilot fuel flow passages 51a, 5q in order to absorb heat from and thus cool the main fuel flow circuit.

The axially-extending portions 62a-l of the main fuel flow passage each comprise a main fuel outlet 64 proximal the downstream end 56 of the injector 50 (proximal the main spray nozzle inlet 63). The main fuel outlets 64 are circumferentially directed such that the main fuel exits the main fuel flow passage in a direction perpendicular to the axial direction.

As can be clearly seen in FIGS. 4, 6 and 7, the injector 50 comprises an upstream manifold 65 comprising the pilot fuel feed 52 and the main fuel feed 61. It also comprises a downstream manifold 66 comprising the main spray nozzle inlet 63.

The upstream and downstream manifolds 65, 66 are axially separated by a plurality of circumferentially-spaced, axially-extending heat transfer conduits 67a-l. Each heat transfer conduit 67a-l comprises one of the axially-extending portions 55a'f, 55'a-f of the two pilot fuel flow passages 51a, 51b. Adjacent heat transfer conduits 67a-l will contain adjacent axially-extending portions 55a-f, 55'a-f of the pilot fuel flow passages.

The upstream manifold 65 comprises an annular portion 68 and a fuel tube 69 carrying the pilot fuel feed 52 and the main fuel feed 61. The fuel tube 69 extends radially from the annular portion 68. The pilot fuel feed 52 and main fuel feed 61 are concentric within the fuel tube 69 with the pilot fuel feed 52 being radially outwards of the main fuel feed 61.

The upstream manifold 65 further comprises the pilot fuel spray nozzle 70 with the pilot fuel spray nozzle inlet 54 located proximal the upstream end 53 of the injector 50/upstream manifold 65. The pilot fuel spray nozzle 70 is supported within the annular portion 68 by radial struts 71. The radial portion 72 of the pilot fuel flow passages 51a, 51b extend within/along at least one of the radial struts 71.

The pilot fuel spay nozzle 70 extends axially forwards of the annular portion 68 and is encircled by the heat transfer conduits 67a-1. There is a radial spacing between the pilot fuel spray nozzle 70 and the heat transfer conduits 67a-l. The pilot fuel spray nozzle 70 comprises a nozzle opening 73 which is proximal the downstream manifold 66.

Figure 8:
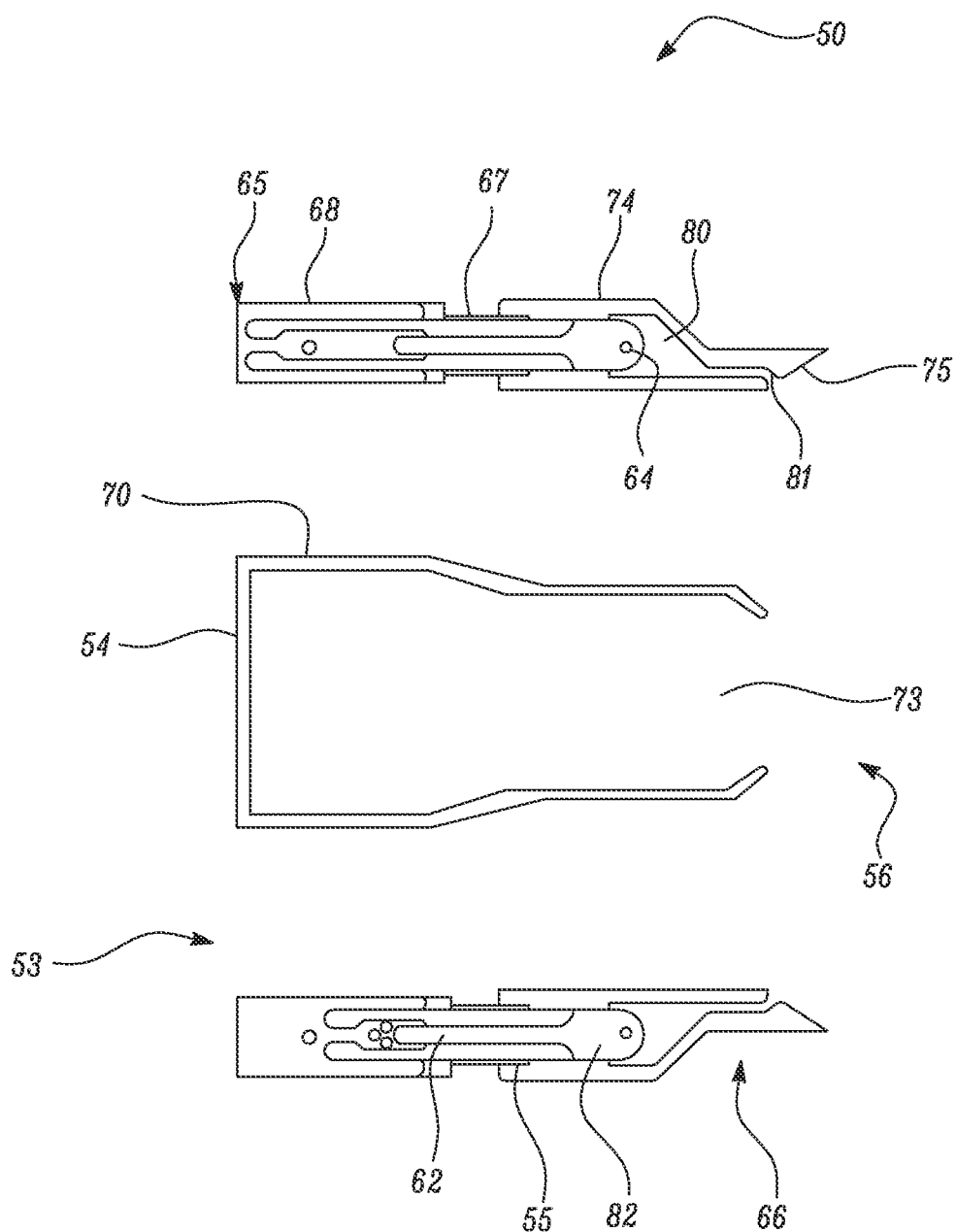
FIG. 8 is an axial cross-sectional view through the fuel injector according to the first embodiment.

As can be seen in FIG. 8, the downstream manifold 66 comprises a main annular portion 74 and a downstream spin chamber 80 defined between inner and outer walls. The spin chamber 80 comprises a spin chamber opening 81 which is encircled by a prefilmer surface 75 defining the main spray nozzle opening 76.

As discussed above and as can be clearly seen in FIG. 8, each heat transfer conduit 67a-l carries one of the axially-extending portions 55a-f, 55'a-f of the pilot fuel flow passage 51a, 51b. Each heat transfer conduit 67a-l also carries one of the axially-extending portions 62a-l of the main fuel flow passage. In each of the heats transfer conduits 62a-l, one of the axially-extending portions 62a-l of the main fuel flow passage and one of the axially-extending portions 55a-f, 55'a-f of the pilot fuel flow passages 51a, 51b are housed concentrically with the axially-extending portion 62a-l of the main fuel flow passage concentrically radially-inwards of the axially-extending portion 55a-f, 55'a-f of the pilot fuel flow passage 51a, 51b. The axially-extending portions 62a-l of the main fuel flow passage extend further downstream (towards the downstream end 56 of the fuel injector than the axially-extending portions 55a-f, 55'a-f to the pilot fuel flow passage and are capped by cap portions 82. The main fuel outlets 64 are machined in the cap portions 82.

The heat transfer conduits 67a-l has an axial length greater than the axial spacing between the upstream and downstream manifolds 65, 66 such that the heat transfer conduits 67a-l extend within the downstream manifold 66 (e.g. within the main annular portion 74) to proximal the main spray nozzle inlet 63. The cap portions 82 are housed within the spin chamber 80.

There is an axial spacing between the cap portions 82 and the heat transfer tubes to allow flow of the pilot fuel from the pilot fuel flow passage into the downstream elbow portions which are machined within the main annular portion 74 of the upstream manifold 65. The upstream elbow portions are similarly machined within the annular portion 68 of the upstream manifold 65.

Although FIG. 7 shows the heat transfer tubes 67 as separate components to the upstream manifold 65, in some embodiments, the heat transfer tubes 67 will be integral with the upstream manifold 65. For example the upstream manifold 65 and heat transfer tubes 67 may be manufactured integrally using ALM methods.

The main fuel outlets 64 from the axially-extending portions 62a-l of the main fuel flow passage are provided in the heat transfer conduits 67a-l e.g. at the axial downstream ends of the heat transfer conduits 67a-l within the downstream manifold 66. By providing the main fuel outlets 64 in the heat transfer conduits 67a-l rather than within the prefilmer surface 75 of the downstream manifold 66, the outlets 64 are isolated from the radiative heat loads that affect the prefilmer surface 75.

It will be understood that the invention is not limited to the embodiments above-described and various modifications and improvements can be made without departing from the concepts described herein within the scope of the following claims.

The invention claimed is:

1. A fuel injector for a gas turbine engine, the fuel injector comprising:
a pilot fuel flow circuit comprising at least one convoluted pilot fuel flow passage extending continuously from a pilot fuel feed at an upstream end of the fuel injector to a pilot fuel spray nozzle inlet; and
a main fuel flow circuit comprising at least one main fuel flow passage extending from a main fuel feed at the upstream end of the fuel injector to a main spray nozzle inlet, wherein:
the at least one convoluted pilot fuel flow passage comprises an even number greater than two of axially-extending pilot fuel flow passage portions,
the axially-extending pilot fuel flow passage portions are in thermal communication with the main fuel flow circuit,
each of the axially-extending pilot fuel flow passage portions has an upstream end proximal the upstream end of the fuel injector and a downstream end distal the upstream end of the fuel injector,
adjacent axially-extending pilot fuel flow passage portions of the at least one convoluted pilot fuel flow passage are connected via a respective elbow portion alternately at the upstream and downstream ends of the adjacent axially-extending pilot fuel flow passage portions such that, in use, pilot fuel can flow in opposing axial directions within the adjacent axially-extending pilot fuel flow passage portions,
the at least one main fuel flow passage each comprises at least one axially-extending main fuel flow passage portion,
the at least one axially-extending main fuel flow passage portion and the at least one axially-extending pilot fuel flow passage portion are concentrically arranged, and
each of the at least one axially-extending main fuel flow passage portion is concentrically radially-inwards of a respective one of the axially-extending pilot fuel flow passage portions.

2. The fuel injector of claim 1, wherein the at least one convoluted pilot fuel flow passage of the pilot fuel circuit comprises two or more convoluted pilot fuel flow passages extending continuously from the pilot fuel feed at the upstream end of the fuel injector to the pilot fuel spray nozzle inlet.

3. The fuel injector of claim 2, wherein the two or more convoluted pilot fuel flow passages comprises two convoluted pilot fuel flow passages, each comprising six of the axially-extending pilot fuel flow passage portions.

4. The fuel injector of claim 1, wherein each of the respective elbow portions comprises two deflections each having a deflection of 90 degrees spaced by a respective circumferentially-extending portion.

5. The fuel injector of claim 1, wherein the at least one axially-extending main fuel flow passage comprises a plurality of axially-extending main fuel flow passage portions, and wherein the at least one axially-extending main fuel flow passage comprises at least one circumferentially-extending portion proximal the upstream end of the fuel injector and in fluid communication with the plurality of axially-extending main fuel flow passage portions.

6. The fuel injector of claim 5, wherein each of the plurality of axially-extending main fuel flow passage portions of the main fuel flow passage is concentrically arranged within the respective one of the axially-extending pilot fuel flow passage portions of the pilot fuel flow passage.

7. The fuel injector of claim 1, wherein the fuel injector comprises an upstream manifold comprising the pilot fuel feed and a downstream manifold comprising the main spray nozzle inlet, the upstream and downstream manifolds being axially separated by a plurality of circumferentially-spaced, axially-extending heat transfer conduits, wherein each of the plurality of circumferentially-spaced, axially-extending heat transfer conduits comprises the respective one of the axially-extending pilot fuel flow passage portions of the at least one convoluted pilot fuel flow passage concentrically arranged with a respective one of the at least one axially-extending main fuel flow passage portion of the at least one main fuel flow passage.

8. The fuel injector of claim 7, wherein each of the plurality of circumferentially-spaced, axially-extending heat transfer conduits carries the respective one of the at least one axially-extending main fuel flow passage portion of the at least one main fuel flow passage concentrically arranged radially inwards of the respective one of the axially-extending pilot fuel flow passage portions of the at least one convoluted pilot fuel flow passage.

9. The fuel injector of claim 7, wherein the upstream manifold comprises an annular portion and a pilot spray nozzle with the pilot fuel spray nozzle inlet located proximal an upstream end of the upstream manifold and the pilot fuel spray nozzle supported within the annular portion by radial struts.

10. A combustion system for a gas turbine engine, wherein the combustion system comprises a fuel injector for the gas turbine engine, the fuel injector comprising:
   a pilot fuel flow circuit comprising at least one convoluted pilot fuel flow passage extending continuously from a pilot fuel feed at an upstream end of the fuel injector to a pilot fuel spray nozzle inlet; and
   a main fuel flow circuit comprising at least one main fuel flow passage extending from a main fuel feed at the upstream end of the fuel injector to a main spray nozzle inlet, wherein:
      the at least one convoluted pilot fuel flow passage comprises an even number greater than two of axially-extending pilot fuel flow passage portions,
      the axially-extending pilot fuel flow passage portions are in thermal communication with the main fuel flow circuit,
      each of the axially-extending pilot fuel flow passage portions has an upstream end proximal the upstream end of the fuel injector and a downstream end distal the upstream end of the fuel injector,
      adjacent axially-extending pilot fuel flow passage portions of the at least one convoluted pilot fuel flow passage are connected via a respective elbow portion alternately at the upstream and downstream ends of the adjacent axially-extending pilot fuel flow passage portions such that, in use, pilot fuel can flow in opposing axial directions within the adjacent axially-extending pilot fuel flow passage portions,
      the at least one main fuel flow passage each comprises at least one axially-extending main fuel flow passage portion,
      the at least one axially-extending main fuel flow passage portion and the at least one axially-extending pilot fuel flow passage portion are concentrically arranged, and
      each of the at least one axially-extending main fuel flow passage portion is concentrically radially-inwards of a respective one of the axially-extending pilot fuel flow passage portions.

11. A gas turbine engine comprising a combustion system, wherein the combustion system comprises a fuel injector for the gas turbine engine, the fuel injector comprising:
   a pilot fuel flow circuit comprising at least one convoluted pilot fuel flow passage extending continuously from a pilot fuel feed at an upstream end of the fuel injector to a pilot fuel spray nozzle inlet; and
   a main fuel flow circuit comprising at least one main fuel flow passage extending from a main fuel feed at the upstream end of the fuel injector to a main spray nozzle inlet, wherein:
      the at least one convoluted pilot fuel flow passage comprises an even number greater than two of axially-extending pilot fuel flow passage portions,
      the axially-extending pilot fuel flow passage portions are in thermal communication with the main fuel flow circuit,
      each of the axially-extending pilot fuel flow passage portions has an upstream end proximal the upstream end of the fuel injector and a downstream end distal the upstream end of the fuel injector,
      adjacent axially-extending pilot fuel flow passage portions of the at least one convoluted pilot fuel flow passage are connected via a respective elbow portion alternately at the upstream and downstream ends of the adjacent axially-extending pilot fuel flow passage portions such that, in use, pilot fuel can flow in opposing axial directions within the adjacent axially-extending pilot fuel flow passage portions,
      the at least one main fuel flow passage each comprises at least one axially-extending main fuel flow passage portion,
      the at least one axially-extending main fuel flow passage portion and the at least one axially-extending pilot fuel flow passage portion are concentrically arranged, and
      each of the at least one axially-extending main fuel flow passage portion is concentrically radially-inwards of a respective one of the axially-extending pilot fuel flow passage portions.

12. A method of cooling a main fuel flow circuit within a fuel injector for a gas turbine engine, the injector comprising a main fuel flow circuit and a convoluted pilot fuel flow circuit, the method comprising the steps of:
   flowing pilot fuel within an even number greater than two of axially-extending pilot fuel flow passage portions of at least one convoluted pilot fuel flow passage;
   and flowing main fuel within at least one axially-extending main fuel flow passage portion of at least one main fuel flow passage, the axially-extending pilot fuel flow passage portions of the at least one convoluted pilot fuel flow passage and the at least one axially-extending main fuel flow passage portion of the main fuel flow passage being concentrically arranged such that each of the at least one axially-extending main fuel flow passage portion is concentrically radially-inwards of a respective one of the axially-extending pilot fuel flow passage portions;

wherein the at least one convoluted pilot fuel flow passage extends continuously from a pilot fuel feed at an upstream end of the injector to a pilot spray nozzle inlet, the axially-extending pilot fuel flow passage portions being in thermal communication with the main fuel flow circuit, wherein each of the axially-extending pilot fuel flow passage portions has an upstream end proximal the upstream end of the fuel injector and a downstream end distal the upstream end of the fuel injector, and wherein adjacent axially-extending pilot fuel flow passage portions of the at least one convoluted pilot fuel flow passage are connected via a respective elbow portion alternately at the upstream and downstream ends of the adjacent axially-extending pilot fuel flow passage portions such that, in use, the pilot fuel can flow in opposing axial directions within the adjacent axially-extending pilot fuel flow passage portions.

* * * * *